(12) United States Patent
Roberts, Jr.

(10) Patent No.: US 8,342,420 B2
(45) Date of Patent: Jan. 1, 2013

(54) RECYCLABLE PLASTIC STRUCTURAL ARTICLES AND METHOD OF MANUFACTURE

(76) Inventor: Richard W. Roberts, Jr., Tecumseh, MI (US)

( * ) Notice: Subject to any disclaimer, the term of this patent is extended or adjusted under 35 U.S.C. 154(b) by 181 days.

(21) Appl. No.: 12/913,132

(22) Filed: Oct. 27, 2010

(65) Prior Publication Data
US 2012/0104110 A1    May 3, 2012

(51) Int. Cl.
*E01B 3/44*    (2006.01)
(52) U.S. Cl. .............................. 238/84; 238/54; 264/45.4
(58) Field of Classification Search ............ 238/29, 238/30, 54, 70, 80, 83, 84, 95, 107, 264, 238/280, 287; 264/45.4, 46.4, 46.6, 46.8, 264/510, 523, 540, 541
See application file for complete search history.

(56) References Cited

U.S. PATENT DOCUMENTS

| | | | | |
|---|---|---|---|---|
| 776,342 | A * | 11/1904 | McCormick | 238/70 |
| 1,588,778 | A * | 6/1926 | Sorensen | 238/280 |
| 3,468,097 | A | 9/1969 | Mack | |
| 3,598,312 | A * | 8/1971 | Hamilton, Jr. | 238/9 |
| 3,813,040 | A | 5/1974 | Heinemeyer | |
| 4,840,973 | A | 6/1989 | Kuwabara et al. | |
| 5,055,350 | A * | 10/1991 | Neefe | 428/331 |
| 5,665,285 | A | 9/1997 | Hattori et al. | |
| 5,713,518 | A | 2/1998 | Fox | |
| 6,179,215 | B1 * | 1/2001 | Shea | 238/29 |
| 6,230,981 | B1 * | 5/2001 | Hill et al. | 238/54 |
| 6,375,892 | B2 | 4/2002 | Thomas | |
| 6,605,343 | B1 | 8/2003 | Motoi et al. | |
| 7,358,280 | B2 | 4/2008 | Berghmans et al. | |
| 7,931,210 | B1 * | 4/2011 | Pike et al. | 238/85 |
| 7,950,592 | B2 * | 5/2011 | Yuan | 238/84 |
| 2004/0232254 | A1 * | 11/2004 | Kowalski | 238/264 |
| 2005/0001048 | A1 * | 1/2005 | Skoblenick et al. | 238/29 |
| 2006/0105650 | A1 | 5/2006 | Yeh | |
| 2006/0131437 | A1 | 6/2006 | Thiagarajan et al. | |
| 2006/0223897 | A1 | 10/2006 | Sasaki | |
| 2007/0040293 | A1 | 2/2007 | Lane et al. | |
| 2008/0083835 | A1 * | 4/2008 | Girardi et al. | 238/29 |
| 2008/0125502 | A1 | 5/2008 | Reichman et al. | |
| 2008/0142611 | A1 | 6/2008 | Scobie | |
| 2010/0028654 | A1 | 2/2010 | Takase | |
| 2012/0102884 | A1 | 5/2012 | Roberts, Jr. | |

FOREIGN PATENT DOCUMENTS

| | | |
|---|---|---|
| JP | 58213028 A | 12/1983 |
| JP | 59155443 A | 9/1984 |
| JP | 59210954 A | 11/1984 |
| JP | 60090744 A | 5/1985 |

OTHER PUBLICATIONS

Product Information: "Arplank, Expanded Bead Foam Packaging Materials", www.jsp.com, pp. 1-21.
Manning, A., Choosing Plastic, www.mmh.com, Oct. 2008, pp. 1-2.
Specter, S.P., The rise of the Plastic Pallet, Modern Materials Handling, Sep. 2009, pp. 1-4.

* cited by examiner

*Primary Examiner* — S. Joseph Morano
*Assistant Examiner* — Zachary Kuhfuss
(74) *Attorney, Agent, or Firm* — Brooks Kushman P.C.

(57) ABSTRACT

The plastic structural article includes an elongated tubular shell having opposed end sections, a middle section therebetween and an interior cavity. The interior cavity has a foam core situated therein. The foam core comprises steam expandable polymer beads which when expanded substantially fill the interior cavity.

22 Claims, 10 Drawing Sheets

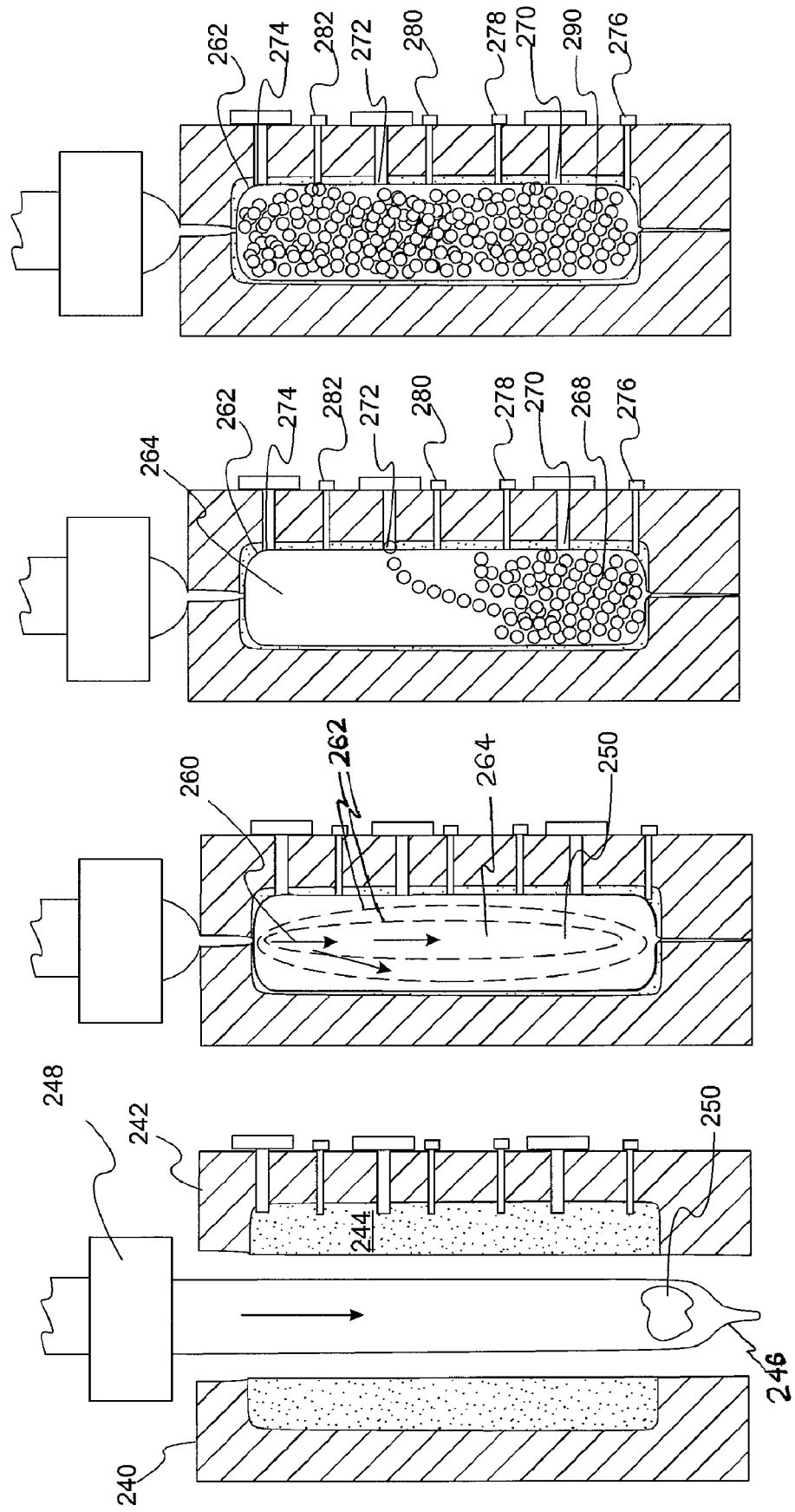

RECYCLABLE PLASTIC STRUCTURAL ARTICLES AND METHOD OF MANUFACTURE

TECHNICAL FIELD

The disclosed embodiments relate to recyclable plastic structural articles and methods of manufacture of same.

BACKGROUND

Substitution of plastic compositions for structural articles formed from non-plastic materials may meet objections regarding relatively low physical properties of the substitute plastic composition. Manufacturers often blend the plastic composition with other resins and additives to improve the physical properties. But, the blends of resins and additives may decrease the recyclablity of the plastic composition.

In one example of a structural article suitable for material substitution, railroad ties support relatively great weights of railroad locomotives and their attached train cars with their contents. As the trains pass over railroad rails supported on railroad ties, the ties experience substantial vibration, in addition to the compressive force of the weight. When the ties are not in use, they are still subjected to harsh environment extremes of temperature, ultraviolet light, and moisture. The degradation of wooden railroad ties through this exposure to the environment requires that the ties must be replaced frequently in order to continue to perform their primary function of supporting the weight of the train. The wood used to make conventional railroad ties is increasingly becoming more expensive. Wooden railroad ties are heavy making the job of replacing them difficult.

SUMMARY

Disclosed embodiments relate to recyclable plastic structural articles and methods of manufacture of same. In at least one embodiment, a plastic structural article includes an elongated tubular shell having opposed end sections, a middle section therebetween and an interior cavity. The article also includes a foam core comprised of steam expandable polymer beads which when expanded substantially fill the interior cavity.

The article in another embodiment, includes a railroad tie having an elongated shell including opposed closed end sections and a middle section therebetween. The shell defines an elongate interior cavity. Substantially filling the cavity is a foam core comprising expanded polyolefin beads.

In yet another embodiment, a method of manufacturing a plastic structural article includes blow-molding a plastic preform in a mold cavity in the shape of an elongated member to form an elongated tubular plastic shell. The shell has opposed end sections, a middle section therebetween and a hollow interior cavity. The method also includes forming at least one fill port and a plurality of heating ports in the wall of the plastic shell. The shell interior cavity is filled with expandable polymer beads. The polymer beads are expanded by injecting a hot, at least partially vaporized, heating medium into the heating ports. The polymer beads expand so as to substantially fill the interior cavity of the shell. The plastic shell is constrained to limit expansion of the shell caused by the heated expanding polymer beads until the assembly is sufficiently cooled to limit substantial further expansion. The mold cavity is opened releasing the plastic structural article.

BRIEF DESCRIPTION OF THE DRAWINGS

FIGS. 13a-13d schematically illustrate a process of manufacture of a railroad tie according to at least one embodiment.

DETAILED DESCRIPTION

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies *mutatis mutandis* to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "co-polymer," "terpolymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way.

It must also be noted that, as used in the specification and the pending claims, the singular form "a," "an," and "the," comprise plural reference unless the context clearly indicates otherwise. For example, the reference to a component in the singular is intended to comprise a plurality of components.

Throughout this application, where publications are referenced, the disclosure of these publications in their entirety are hereby incorporated by reference into this application to more fully describe the state-of-art to which the invention pertains.

Figure 1:
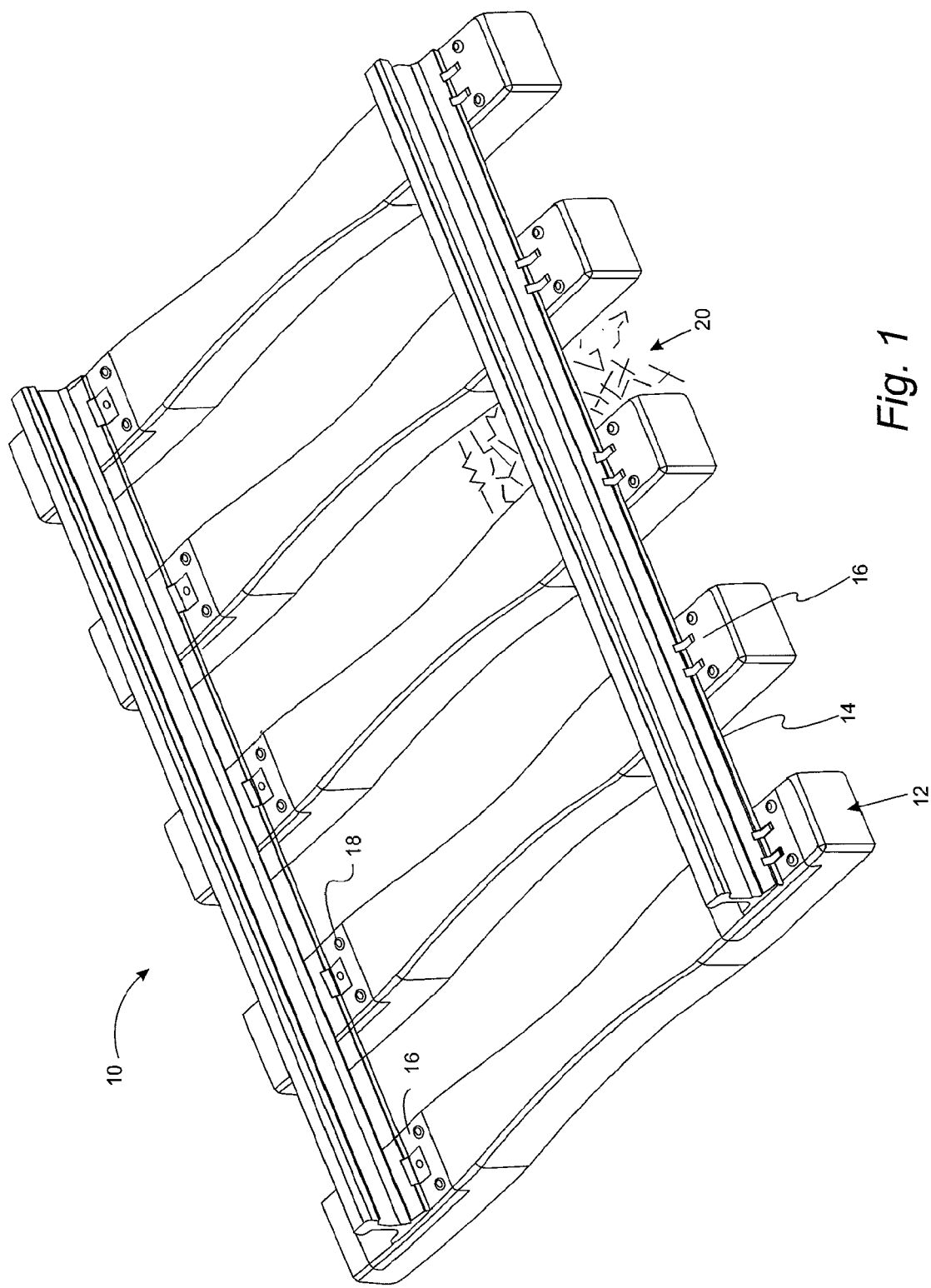
FIG. 1 schematically illustrates a fragmentary isometric view of a rail pattern according to at least one embodiment.

Regarding FIG. 1, a section of railroad track is shown having a rail pattern 10 comprising two lengths of a railroad rail 14 that supports a maximum length of a span of a railroad car or locomotive from truck to truck. In at least one embodiment, rail pattern 10 comprises 5 to 50 railroad ties 12. In another embodiment, rail pattern 10 comprises 20 to 35 railroad ties 12. In yet another embodiment, rail pattern 10 comprises 25 to 32 railroad ties 12.

In at least one embodiment, rail pattern 10 includes railroad ties 12 situated on a rail bed 20. Ties 12 support at least two rails 14 which are parallel and spaced apart. Rail 14 is connected to railroad tie 12 with a plate 16 connected to rail 14. Plate 16 is fastened to railroad tie 12 by one or more spikes 18.

Figure 2:
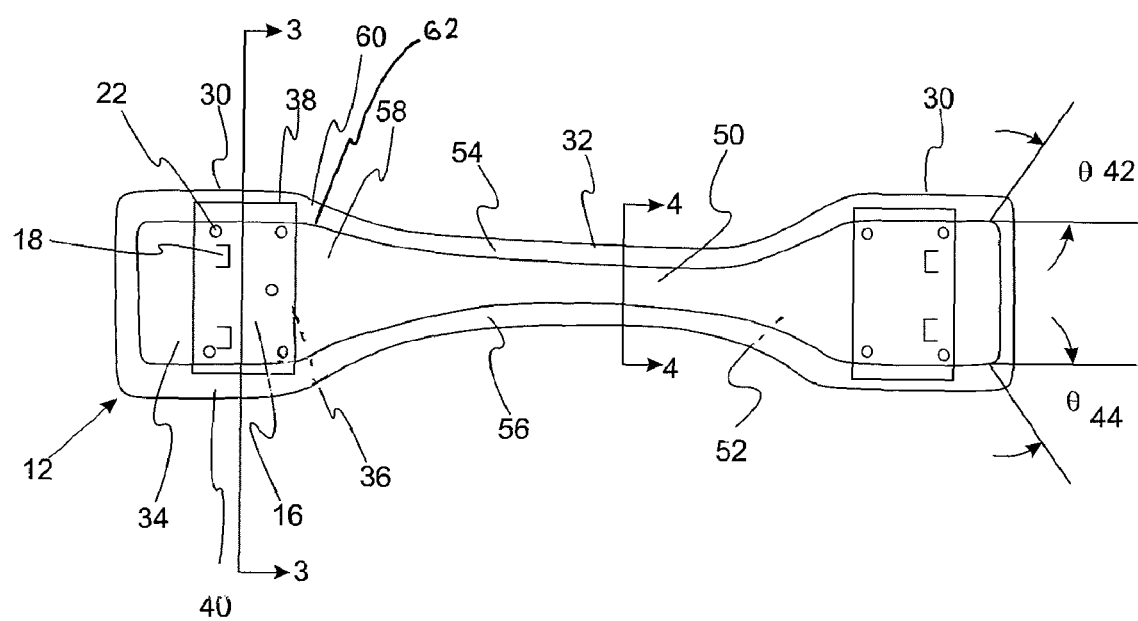
FIG. 2 schematically illustrates a railroad tie according to at least one embodiment.
Figure 3:
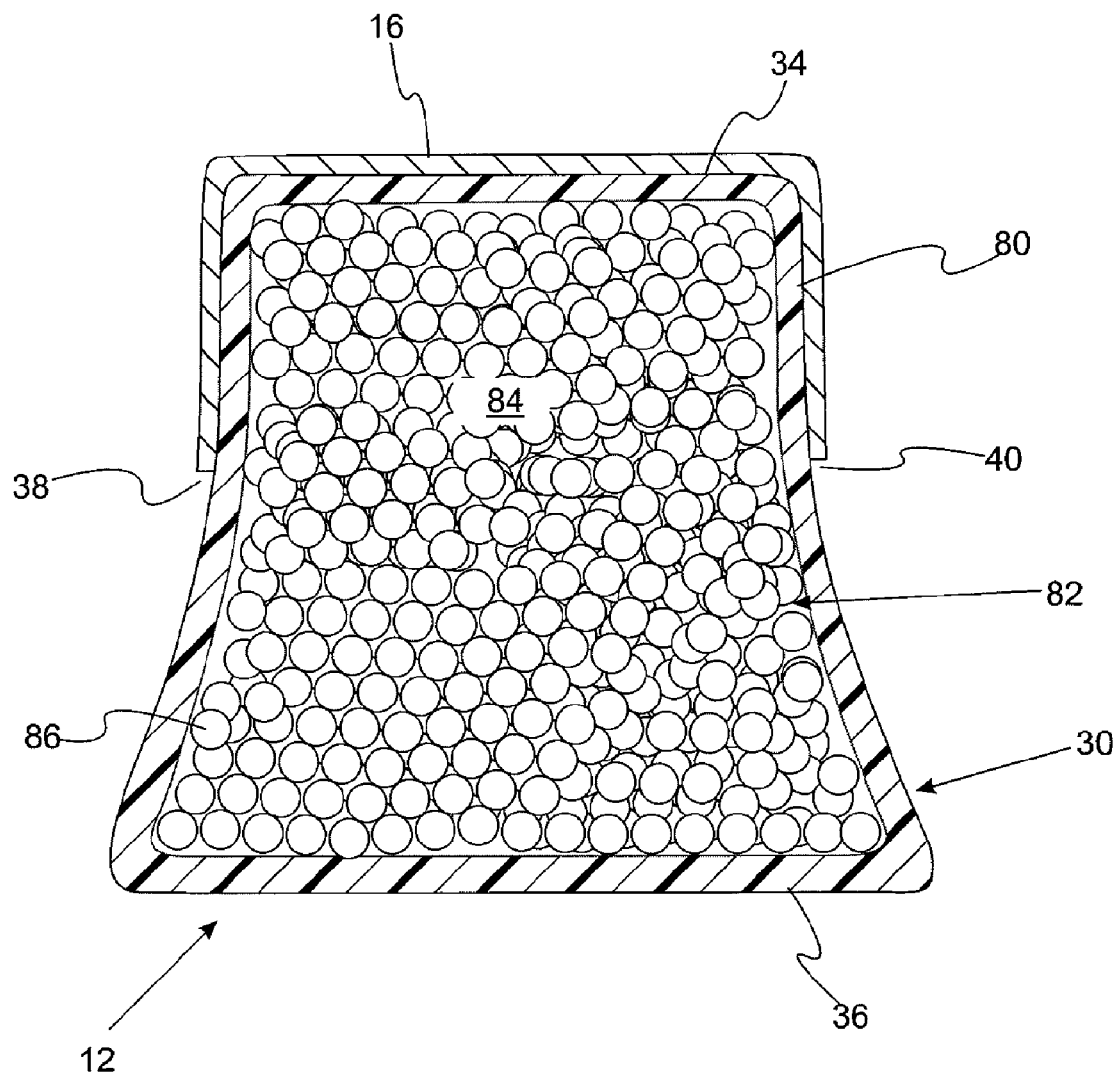
FIG. 3 schematically illustrates a cross-sectional view of a railroad tie along axis 3-3 in FIG. 2.

Turning now to FIG. 2, an embodiment of railroad tie 12 is schematically illustrated. Railroad tie 12 has two end sections 30 and a middle section 32. End section 30 includes a top surface 34 to which plate 16 is fastened. Opposed and parallel to top surface 34 is bottom surface 36 which is in contact with rail bed 20. Connecting top surface 34 and bottom surface 36 are two sides 38 and 40. An angle 42 between side 38 and top surface 34 may be perpendicular or range from 60° to 120°. An angle 44 between side 40 and surface 34 may also be perpendicular or, in another embodiment, range from 60° to 120°. Sides 38 and 40 may be linear, or curvilinear as illustrated in FIG. 3.

The height of the railroad tie 12 between top and bottom surfaces 34 and 36 may range from 4 inches to 16 inches in various embodiments. The width between sides 38 and 40 may range from 4 inches to 16 inches in different embodiments. The width between sides 38 and 40 may be effective to create a short column.

Figure 4:
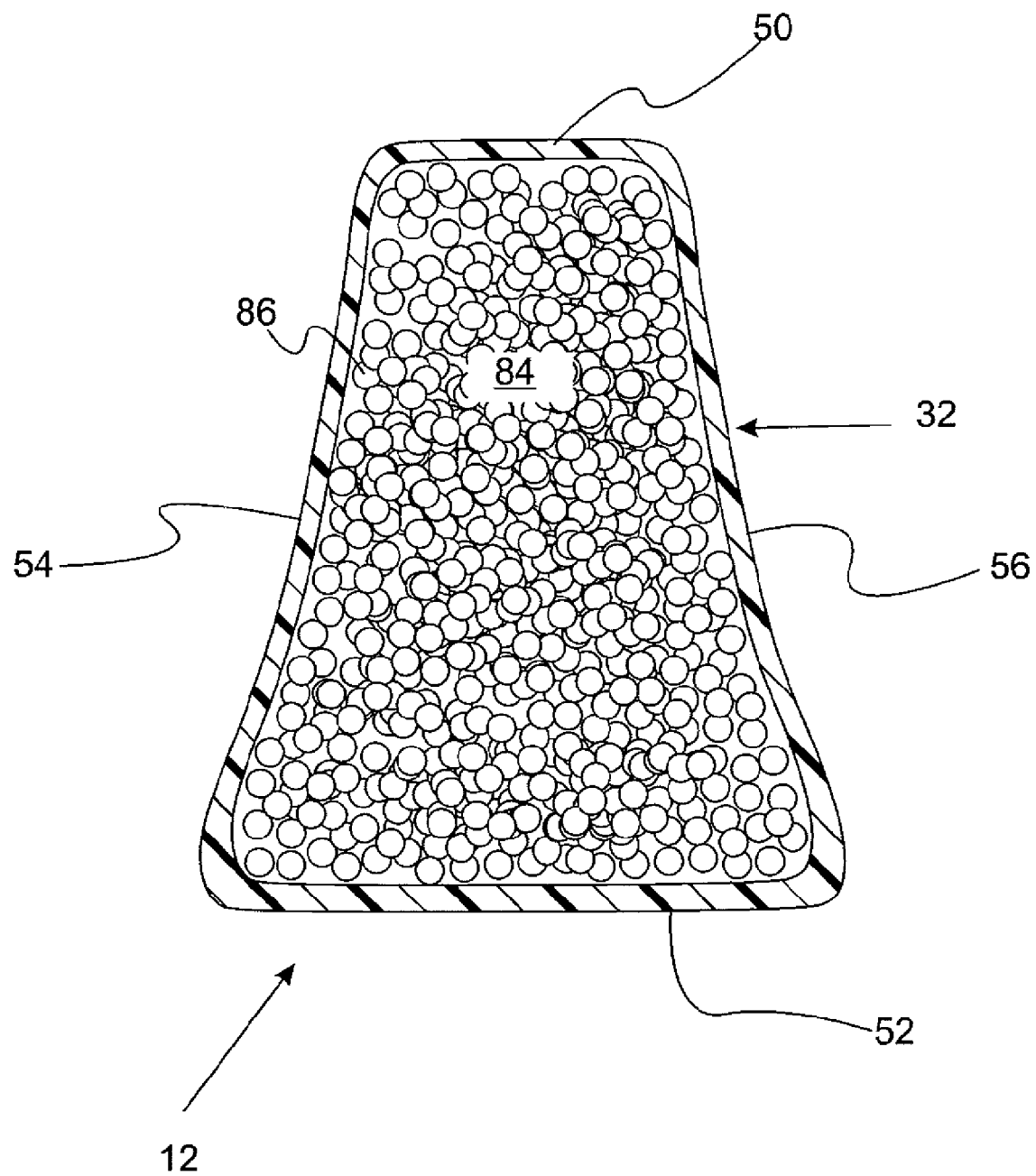
FIG. 4 schematically illustrates a cross-sectional view of a railroad tie along axis 4-4 in FIG. 2.

Middle section 32 includes a top surface 50 and a bottom surface 52 opposed and spaced apart from top surface 50. Connecting top surface 50 and bottom surface 52 are sides 54 and 56. Sides 54 and 56 may be linear, or curvilinear such as convex or concave, as illustrated in FIG. 4.

A transition 58 between the top surface 34 of end section 30 and top surface 50 of middle section 32 may be linear or curvilinear. A transition 60 between either sides 38 and 54 or sides 40 and 56 of the end section 30 and the middle section 50 may be linear or curvilinear. In at least one embodiment, the intersection of transitions 58 and 60 forms a Coons corner geometry 62.

Turning now to FIG. 3, a cross-sectional view of the end section 30 of railroad tie 12 along axis 3-3 of FIG. 2 is schematically illustrated. Wall 80, which includes outer periphery top and bottom surfaces 34 and 36, as well as sides 38 and 40, defines an interior cavity 82 into which a core 84 is formed. Wall 80 may be formed from a polymeric composition. The polymeric composition may include thermoplastic and/or thermoset polymers. In at least one embodiment, the polymeric composition is recyclable. Non-limiting examples of polymeric compositions suitable for wall 80 include polyolefins, such as polypropylene and polyethylene.

In certain embodiments, especially when the plastic standard articles are exported to cold environment, wall 80 includes a blow moldable thermoplastic polyolefin/polypropylene blend, a thermoplastic elastomer/polypropylene blend interpenetrating polyolefin blend, a thermoplastic having a glass transition temperature less than −80° C./polyolefin blend, a heterogeneous polymer blend, and a thermoplastic having a glass transition temperature less than −20° C./polyolefin blend, a thermoplastic vulcanizate/polyolefin blend. In certain embodiments, hetergeneous polymer blends having a crystalline thermoplastic phase and a high molecular weight or crosslinked elastomeric phase may be supplied by Exxon Mobile or Advanced Elastomer Systems.

In at least one embodiment, the ratio of thermoplastic polymer to polyolefin ranges from 5 wt. % to 70 wt. % of the blend. In another embodiment, the ratio of thermoplastic polymer to polyolefin ranges from 10 wt. % to 40 wt. %.

The thickness of wall 80 may range from 0.03 inches to 0.5 inches in at least one embodiment. In another embodiment, the thickness of wall 80 may range from 0.125 inches to 0.25 inches. In the illustrated embodiment, the wall is made of an elongated tube of polypropylene material having a wall thickness ranging from 0.14 inches to 0.17 inches before shrinkage which is blow-molded into the shape of the tie 12 having a finished wall thickness ranging from 0.13 to 0.16 inches.

Core 84 may include steam-expandable polymer particles 86, such as expanded polyolefin polymer beads. In at least one embodiment, the expanded polyolefin polymer beads includes expanded polypropylene polymer beads (EPP). In yet another embodiment, core 84 includes expanded high molecular weight polypropylene polymer beads. In yet another embodiment, homopolymer beads are included in the expanded polyolefin beads in order to increase the stiffness of core 84. As a non-limiting example, when the homopolymer polyolefin is a homopolymer polypropylene, the stiffness increases such that a 100,000 lb load yields a 5.8% strain and a compression of only 0.007 inches. In another example, the strain ranges from 2% strain to 10% strain. In at least one embodiment, EPP may be formed in situ by injection of steam into polypropylene beads to form steam-injected expanded polypropylene. It is understood that a portion of core 84 may comprise polyolefin beads in an unexpanded configuration or a partially expanded configuration.

Steam-injected expanded polypropylene may have a density ranging from 1 lb/ft$^3$ to 20 lbs/ft$^3$. In yet another embodiment, steam-injected EPP may have a density ranging from 1.5 lbs/ft$^3$ to 10 lbs/ft$^3$. In yet another embodiment, steam-injected EPP may have a density ranging from 2 lbs/ft$^3$ to 6 lbs/ft$^3$. In yet another embodiment, steam-injected EPP may have a density ranging from 3 lbs/ft$^3$ to 5 lbs/ft$^3$.

A load applied by a train may be more broadly distributed throughout core 84 by wrapping plate 16 around the sides 38 and 40 as shown in FIG. 3. Plate 16 forms an inverted "U" shape in order to support sides 38 and 40 and limits outward defection under load.

In FIG. 4, middle section 34 of railroad tie 12, in certain embodiments, includes a cavity 84 which is filled with expanded polyolefin. The expanded polyolefin particles 86 filling cavity may have a density that is less than, equal to, or greater than the density of expanded polyolefin in cavity 84 of end section 30. In another embodiment, end section 30 has a density of EPP that is at least 1 lb/ft$^3$ less than the density of EPP in middle section 34. While FIGS. 3 and 4 describe having 3 density zones, it is understood that railroad tie 12 may have one or more density zones without exceeding the scope or spirit of the embodiment. Further, it is understood that, in certain embodiments, the density zones may comprise a relatively uniform gradient of density throughout portions of the railroad tie 12 without relatively clear demarcation of one or more density zones. In the illustrated embodiment, the density of the EPP beads in the end section is 5 lbs/ft$^3$ while the density of the EPP beads in the middle section is 3 lbs/ft$^3$.

Figure 5:
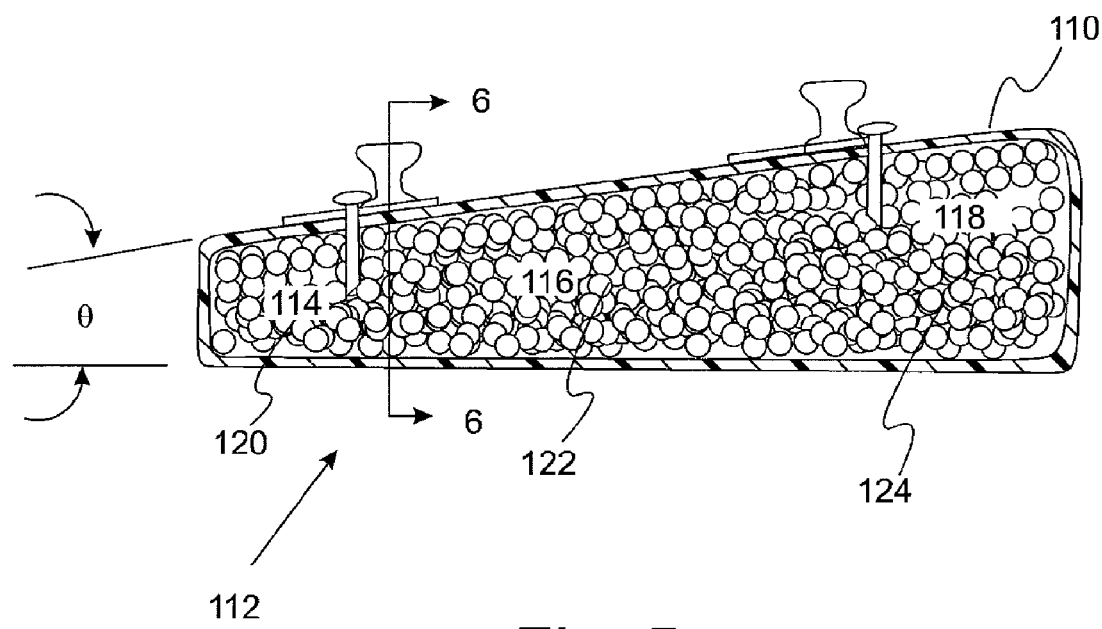
FIG. 5 schematically illustrates a cross-sectional view of a second railroad tie embodiment.

Turning now to FIG. 5, in at least one embodiment an angled railroad tie 112 suitable for use in a curved railroad pattern is schematically illustrated in cross-sectional view. Angled railroad tie 112 is formed from an angular wall section 110 which defines three sub-cavities 114, 116 and 118. Into cavity 114, a first expanded polyolefin 120 is formed. Into sub-cavity 116, a second expanded polyolefin 122 having a density less than expanded polyolefin 120 is formed. Into cavity 118, a third expanded polyolefin 124 having a third density is formed. In other embodiments, the densities of expanded polyolefins 120, 122 and 124 may be equal or different.

The angle of angled railroad tie 112 is given by angle ⊖. Angle ⊖ is determined by a camber needed for safe passage of a train in a curve in the rail track pattern 10. It is desirable to have angled railroad tie 112 because rail bed 20 may be uniformly prepared as a flat and level bed surface. In at least one embodiment, the angle ⊖ may range from 0.1° to 30°. In another embodiment, the angle ⊖ may range from 0.5° to 10°. In yet another embodiment, the angled railroad tie comprises a wedge shape.

Figure 6:
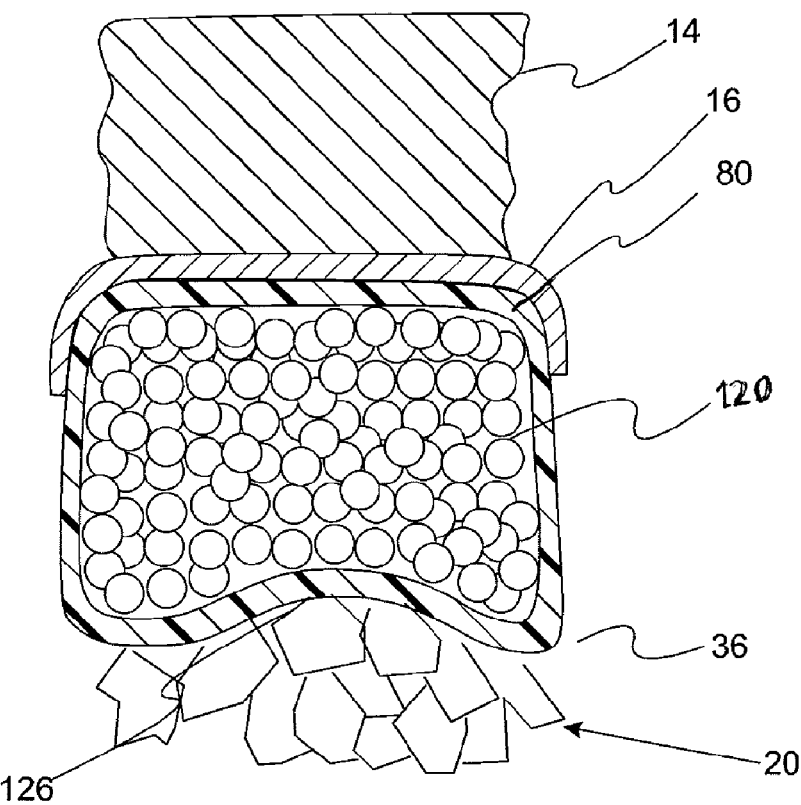
FIG. 6 schematically illustrates a fragmentary cross-sectional view of a railroad tie along axis 6-6 in FIG. 5.

Turning now to FIG. 6, a transverse, cross-sectional view along axis 6-6 of FIG. 5 is illustrated. Bottom surface 36, in at least one embodiment, includes a retention structure 126 which interacts with rail bed 20 to form an interference that reduces the tendency of the railroad tie 112 to move when a directional force is applied to railroad tie 112 by the passage of a train.

Figure 7:
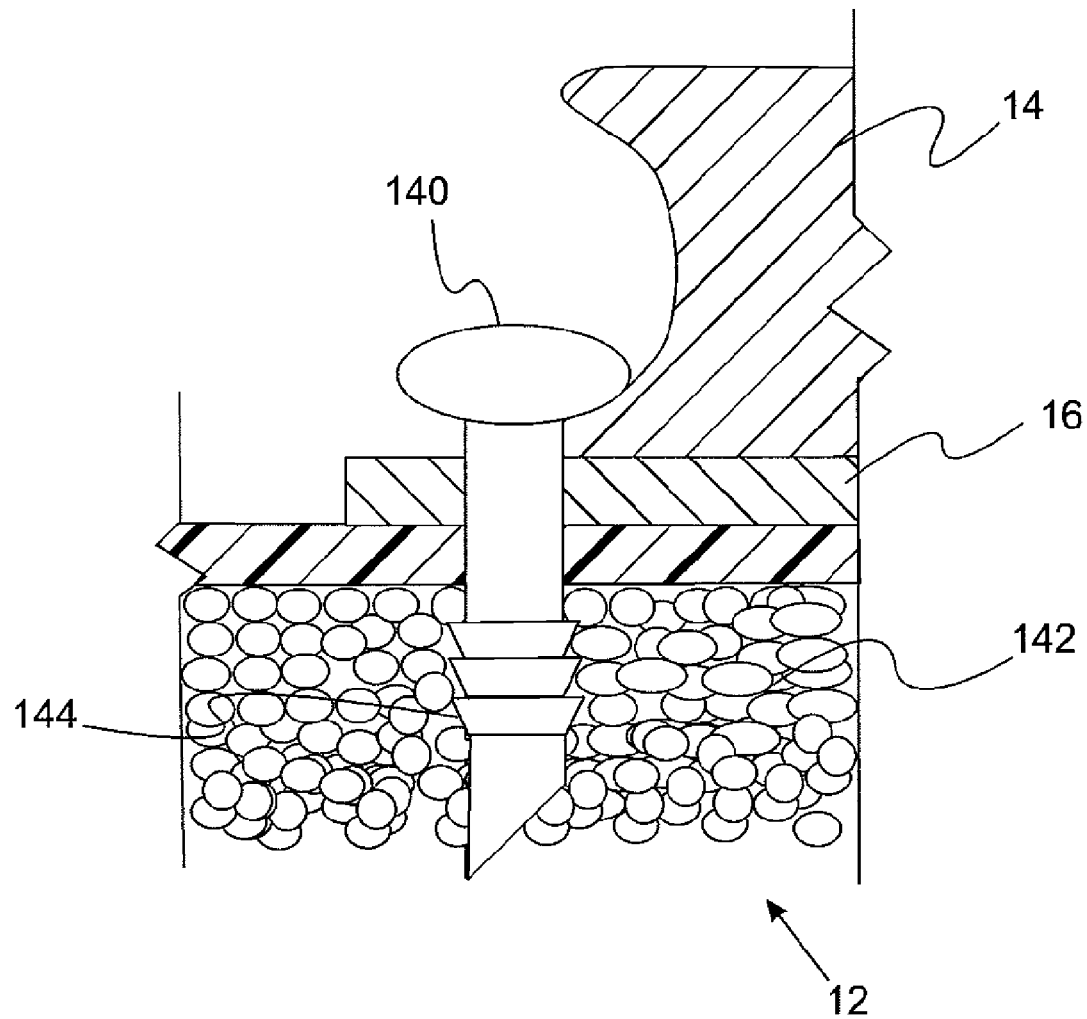
FIG. 7 schematically illustrates a fragmentary longitudinal, cross-sectional view of a railroad tie and rail system illustrating spike placement.

FIG. 7 illustrates a ringed shank fastener 140, such as a spike for use with railroad tie 12. The expanded polyolefin 142 moves aside as the ringed shank spike 140 is driven into railroad tie 12 in at least one embodiment. The expanded polyolefin 142 then rebounds to wrap around the ring shanks 144 of the spike 140 to secure the rail 14 and plate 16 to railroad tie 12.

In at least one embodiment ring shank 144 extends 0.100 inches to 0.300 inches from the root of spike 140. Ring shank 144 is configured as an inverted frustro conical section. Spike 140 may include a plurality of such frustroconical sections sequentially configured along the longitudinal axis of spike 140. It is understood that other shapes providing an undercut may be suitable for use with spike 140.

Figure 8:
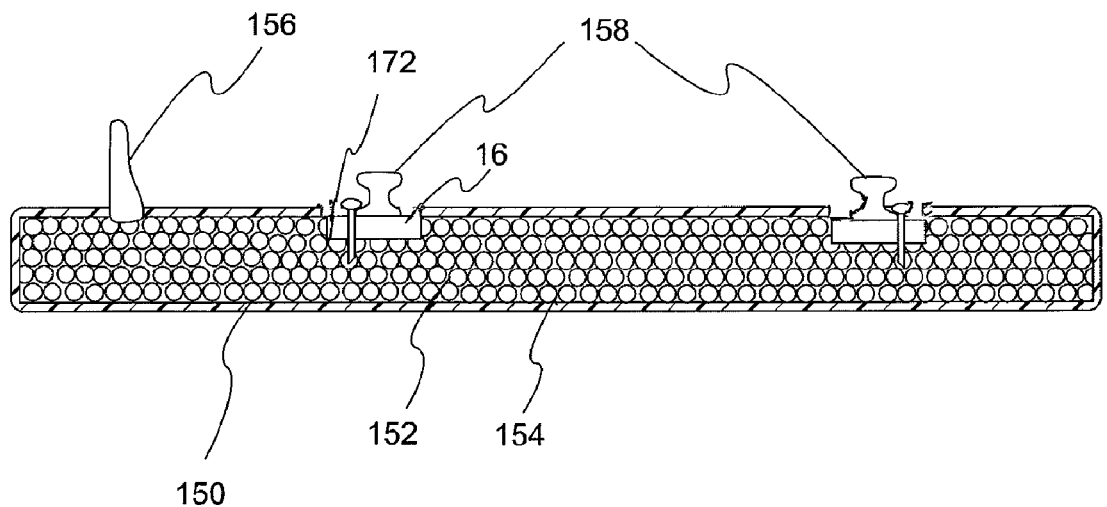
FIG. 8 schematically illustrates a cross-sectional view of a third rail configuration with a railroad tie.

FIG. 8 illustrates a third rail configuration for use with a railroad tie 150 according to at least one embodiment. Railroad tie 150 includes an expandable polyolefin 152 in a cavity defined by wall 154. A third rail device 156 is mounted on railroad tie 150. Third rail device 156 is electrified to supply power to an electrical train. Electrical power is then transferred to rails 158 back to the power station.

In addition, FIG. 8 illustrates having plate 16 inset into a plate retention structure 172 embossed into tie 150. It is understood that retention structure 126 and plate retention structure 172 may be present in the same railroad tie.

Figure 9:
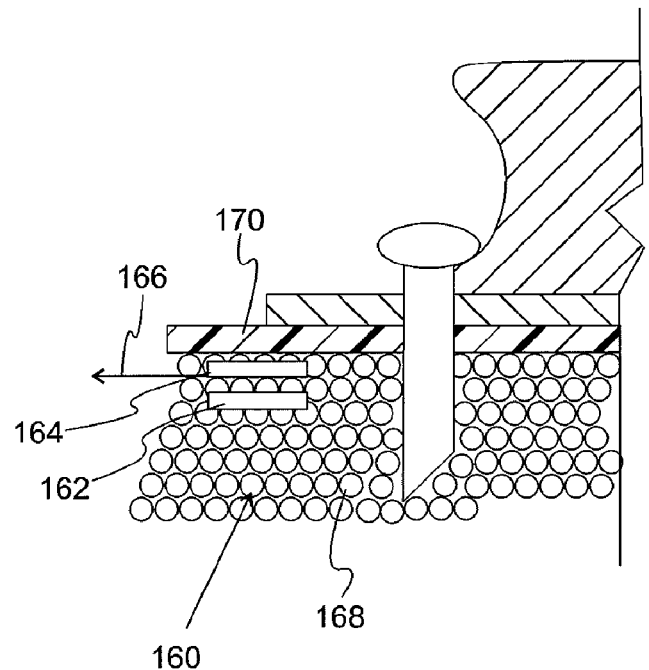
FIG. 9 schematically illustrates a fragmentary cross-sectional view of a railroad tie with load sensors.

FIG. 9 illustrates a fragmentary cross-section of a railroad tie 160 in which sensors are embedded according to at least one embodiment. One or more sensors, such as a RFID chip 162 with a piezoelectric strain gauge 164, may be embedded in an expanded polyolefin 168 in a cavity defined by wall 170. An optional conduit 166 may permit electrical connection of sensor 164 to an external signaling device. Sensors 162 and/or 164 may be introduced into the expanded polyolefin 168 prior to injection of the steam to expand the polyolefin beads. In another embodiment, the sensors may be place in the railroad tie 160 after demolding of the railroad tie by mechanical insertion means known in the art.

A typical railroad tie 12, in at least one embodiment, has a weight ranging from 10 lbs. to 200 lbs. for a 9 inch by 7 inch by 102 inch railroad tie. In another embodiment, railroad tie 12 has a weight ranging from 20 lbs. to 100 lbs. In yet another embodiment, railroad tie 12 has a weight ranging from 30 lbs. to 75 lbs so that the tie can be carried by a single worker.

When railroad pattern 10 uses railroad tie 12, the expanded polyolefin core functions as an energy absorber. In at least one embodiment, railroad tie 12, when using expanded polypropylene as the core, experiences a deflection before permanent set in excess of 25%.

The force needed to deflect the railroad tie may be characterized by a spring rate which is a function of a cross-sectional area bending moment of the railroad tie 12, a length of the railroad tie 12 and an elastic modulus of the expanded polyolefin. Having a higher spring rate than wood, the expanded polyolefin in the railroad tie 12 may have a greater yield stress than wood. Having greater yield stress may result in the expanded polyolefin railroad tie having greater energy absorption than the wood railroad ties. Increased energy absorption by the expanded polyolefin-based railroad ties may result in a relatively quiet railroad system when the train passes over the expanded polyolefin-based railroad ties.

The spring rate of the railroad tie may be increased or decreased by increasing or decreasing the density of the expanded polyolefin in the railroad tie core by use of methods disclosed in certain embodiments herein.

Polyolefin beads and methods of manufacture of unexpanded polyolefin beads suitable for making the illustrated embodiment are described in Japanese patents JP60090744, JP59210954, JP59155443, JP58213028, and U.S. Pat. No. 4,840,973, all of which are incorporated herein by reference. Non-limiting examples of expanded polyolefins are ARPLANK® and ARPRO® available from JSP, Inc. (Madison Heights, Mich.).

The expanded polypropylene, such as the JSP ARPRO$^{TS}$ EPP, which has no external shell, exhibits physical properties such as in Table 1.

TABLE 1

| Property | Test Method | Units | Value | | | | | |
|---|---|---|---|---|---|---|---|---|
| Density | ASTM D-3575 | lbs/ft$^3$ | 1.0 | 2.8 | 3.7 | 4.2 | 4.6 | 5.0 |
| Compressive Strength | ASTM D-3575 | lbf/in$^2$ | | | | | | |
| @ 10% deflection | | | 8.4 | 32 | 44 | 53 | 61 | 68 |
| @ 25% deflection | | | 11 | 42 | 57 | 65 | 76 | 84 |
| @ 50% deflection | | | 19 | 54 | 73 | 84 | 97 | 112 |
| @ 75% deflection | | | 41 | 111 | 155 | 183 | 220 | 251 |
| Compressive Set | ASTM D-3575 | % | | | | | | |
| @ 25% deflection | | | 8 | 7 | 7 | 7 | 7 | 7 |
| @ 50% deflection | | | 16 | 12 | 12 | 12 | 12 | 12 |
| Compressive Creep @ 1000 hr | ASTM D-3575 | % | <0.5 | 1 | 1.5 | 2.5 | 3.0 | 3.5 |
| Service Temperature | ASTM D-3575 | °C. | 100 | 100 | 100 | 100 | 100 | 100 |

Figure 10:
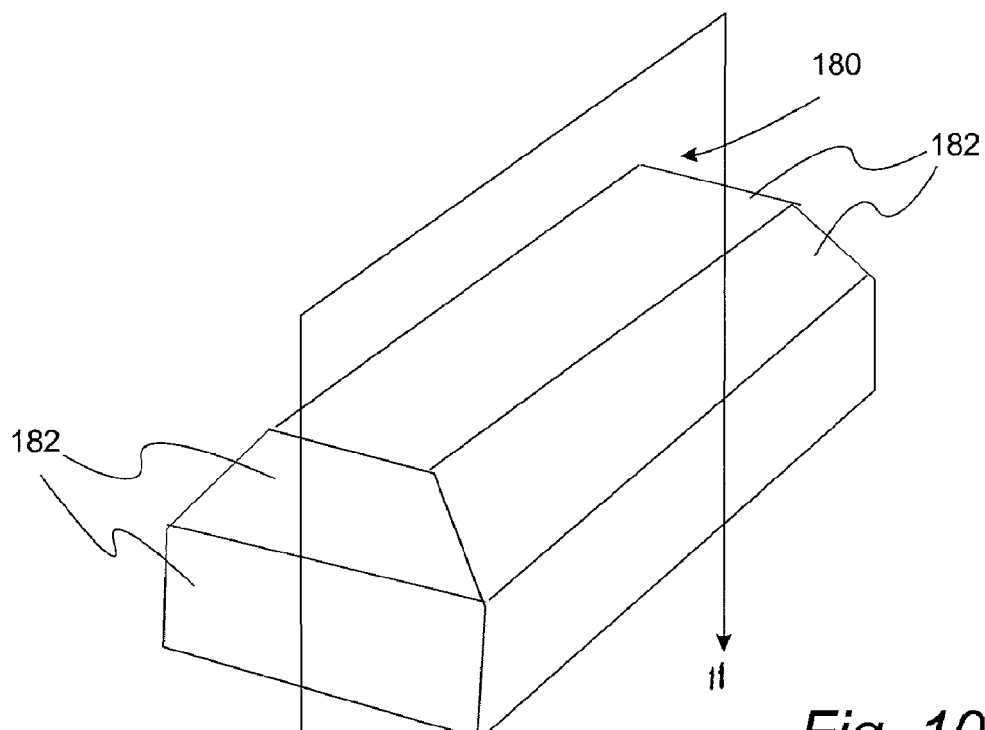
FIG. 10 schematically illustrates a bumper according to at least one embodiment.
Figure 11:
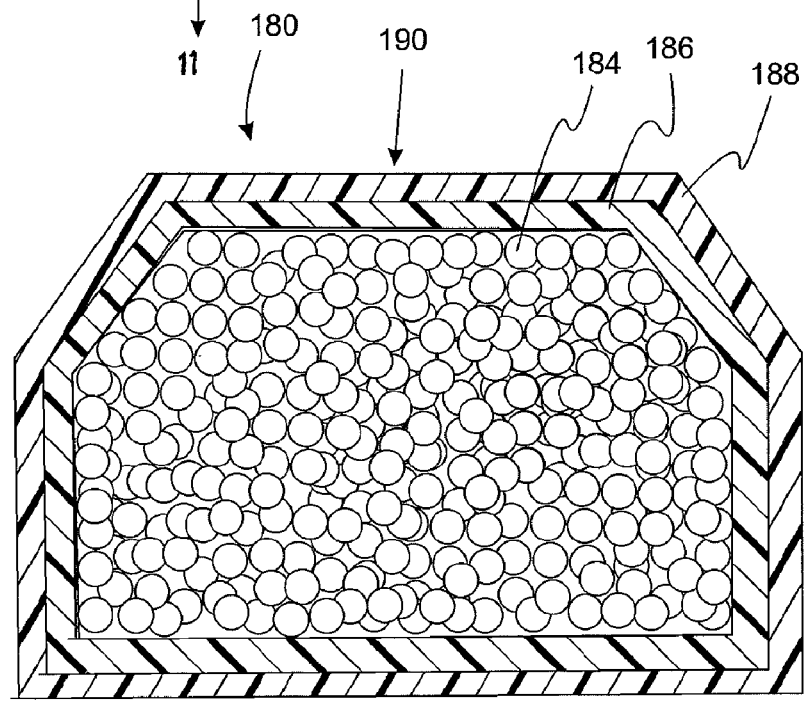
FIG. 11 schematically illustrates a cross-sectional view along axis 11-11 of FIG. 10.

Turning now to FIGS. 10 and 11, an embodiment of a bumper 180, such as the bumper suitable for a large truck chock block, a parking lot bumper, a dock bumper, a golf cart bumper, a roof for a low-speed vehicle, or ship fenders is schematically illustrated in isometric view in FIG. 10. Bumper 180 has an elongated tubular shape with one or more facets 182. The roof for the low-speed vehicle may range in thickness from 0.25 inches to 2 inches, preferable 0.75 inches to 1.25 inches.

In FIG. 11, a longitudinal cross-sectional view along axis 11-11 of FIG. 10 is schematically illustrated. The core 184 has a substantially uniform density of steam-expanded polypropylene beads throughout the entire profile of the elongated bumper 180. The shell 190, in at least one embodiment, is comprised of two layers: an inner layer 186 and an outer layer 188. The two layers 186 and 188, are formed concurrently when a blow mold parison is formed with two layers by coextrusions or methods known in the art. Inner layer 186 may have a first set of properties, such as recycled plastic composition, and outer layer 188 may have a second set of properties, such as including an ultraviolet light resistance package or a pigment. It is understood that outer layer 188 may have a different composition from inner layer 186. As a non-limiting example, outer layer 188 may include a co-polymer or 0-5 wt % of linear low density polyethylene (LLDPE) in order to increase flexibility of outer layer 188 resulting in reduced stress cracking. It is further understood that while two layers are illustrated here, a plurality of layers is contemplated. In another embodiment, the number of layers may range from one to 11. It is preferred that inner layer 186, outer layer 188, and core 184, have similar, if not identical compositions, to improve the recyclability of bumper 180.

Figure 12:
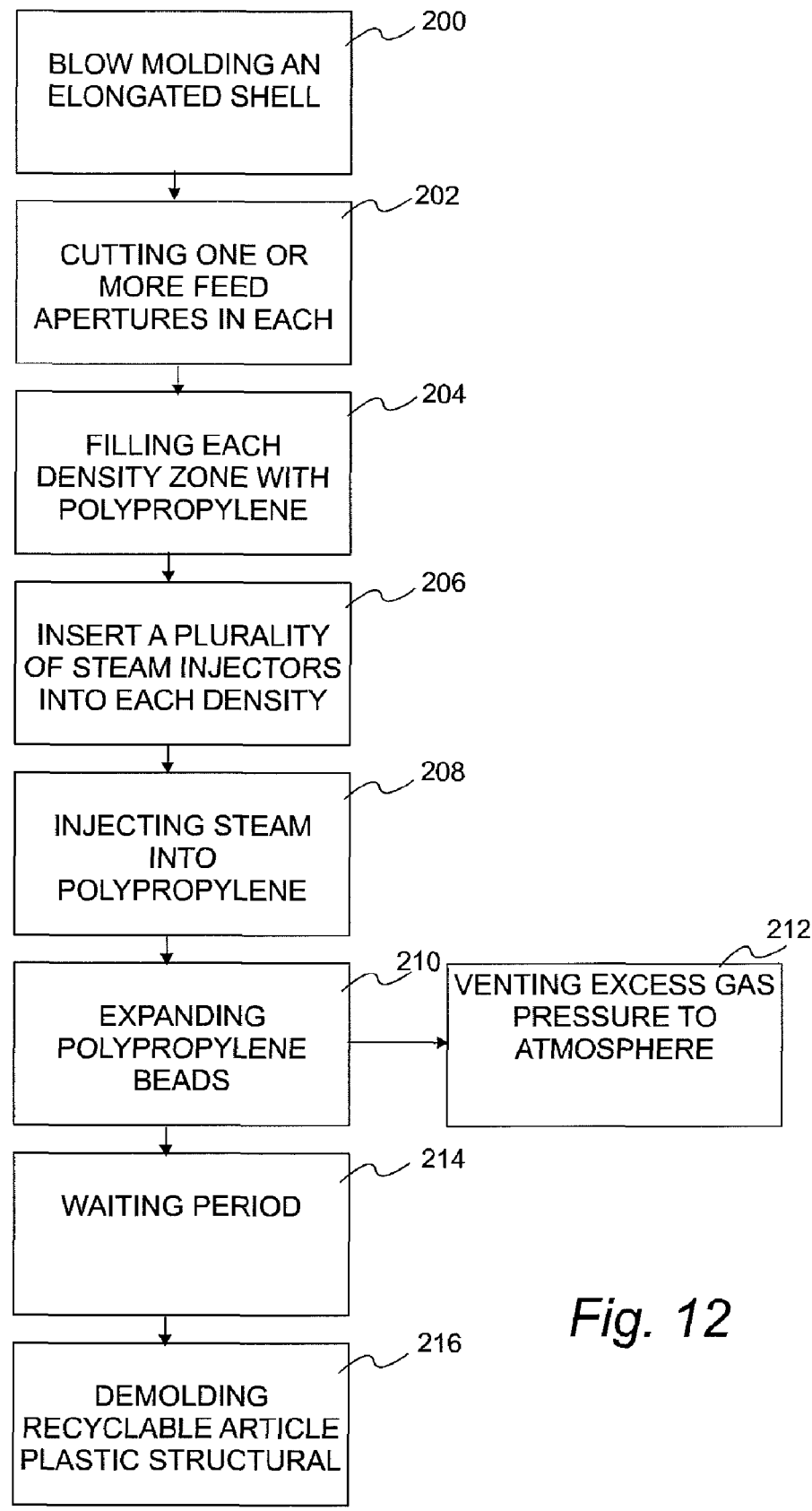
FIG. 12 illustrates a process flow diagram of a method of manufacture of a railroad tie according to at least one embodiment.

FIG. 12 diagrammatically illustrates a method for manufacturing the recyclable plastic structural article having multiple core density zones, in at least one embodiment, which includes blow-molding a hollow elongated shell in step 200. Feed apertures, such as an inlet, and heating ports are cut or pierced during step 202 into the blow-molded elongated shell of step 200. Polyolefin pellets are fed into the cavity of the elongated shell of step 200 during step 204. The density of polyolefin pellets in the lower first end of the elongated shell, are feed in first followed by the middle section, and/or the second end is controlled in step 204 during filling of the shell in one or more density zones. Steam injection needles can be inserted during step 206 into each density zone through heating ports or alternately the needles can be inserted at sit 204 before filming. In step 208 steam is injected at sufficient pressure effective to cause the polypropylene pellets to expand in step 210. Excess pressure is vented to the atmosphere in step 212. The molded railroad tie is allowed to cool in step 214. The mold is opened in step 216 to release the blow-molded recyclable plastic structural article.

Blow-molding step 200 preferably includes extruding a tubular paracen. The mold is closed on the paracen and about 90 to 100 lbf/in$^2$ pressure gas is applied to the paracen interior cavity. The gas injected into the paracen causes the plastic to conform to the shape of the walls of the mold. One or more gas injection needles are introduced to the paracen prior to the cooling the plastic on the mold walls. Spacing between steam injection needles may vary with the density of unexpanded beads because the steam migration is limited. In at least one embodiment, the spacing between adjacent steam injection needles ranges from 2 inches to 6 inches.

In at least one embodiment, at approximately one half of the length of the cooling period, typically referred to as a blow cycle, feed apertures, such as fill ports, are cut. The cutting tools are withdrawn from the mold and a staged fill sequence for polyolefin pellets begins in step 204. The filling is preferably conducted from the bottom up. Upon completion of the staged fill sequence, the feed apertures are optionally closed with spin-welded plugs. The steam injection needles are injected to introduce steam for an injection time period ranging from 0.5 to 3 seconds, an injection time period sufficient to expand the bead. In at least one embodiment, steam is introduced as super heated steam. In another embodiment, steam is introduced at a pressure less than the clamp pressure on the mold sections. In yet another embodiment, steam is introduced in a range of 15 lbf/in$^2$ to 120 lbf/in$^2$. In at least one embodiment, the steam is introduced at 280° Fahrenheit and 60 lbf/in$^2$ pressure. After a cooling time period, when post-mold expansion effectively ceases, the mold is opened to release the blow-molded railroad tie. In at least one embodiment, the time to cool the railroad tie so that post mold expansion does not substantially occur ranges from about 1 minute to 8 minutes. Optionally, the mold may be vented to the atmosphere to release excess gas pressure or the mold may be burped, i.e., opened briefly and then re-closed.

Embodiments of steps 200, 202, 204, 206, and 208 are illustrated in FIGS. 13a-13d.

In FIG. 13a, blow mold sections 240 and 242 define a blow mold cavity 244 into which a molten polyolefin parison 246 is extruded from an extruder 248. Parison 246 defines an internal parison cavity 250.

In FIG. 13b, blow mold sections 240 and 242 close upon parison 246. Gas 260 is injected into parison cavity 250 inflating the hot parison 246 while still soft and deformable to conform to the walls of the blow mold cavity 244 defining a shell 262 having a cavity 264 which may be larger than the original parison cavity 250.

In FIG. 13c, steps 202 and 204 of FIG. 10 are illustrated as feed apertures 270, 272, and 274 are cut through shell 262. Staged filling begins as unexpanded EPP beads 268 are introduced to cavity 264 through an EPP introduction device fitted to blow mold section 242. At a first stage, EPP beads 268 are introduced through feed aperture 270. When the cavity 264 is substantially filled to the height of feed aperture 270, a second stage introduces unexpanded EPP beads 268 through aperture 272 until that portion of cavity 264 is substantially filled. A third stage introduces unexpanded EPP beads 268 through aperture 274 until the cavity 264 is filled.

EPP introduction device (not shown) is withdrawn from apertures 270, 272, and 274. The apertures 270, 272, and 274 are plugged. Steam injection needles 276, 278, 280, 282 are inserted through blow mold section 242 and shell 262 into the filled cavity 264.

In FIG. 13d, steam is injected through steam injection needles 276, 278, 280, 282 into unexpanded beads 268 causing the beads to expand forming a core 290 in the area that was previously cavity 264, and bonded to the shell 262.

It should be understood that other embodiments may use a heating medium other than steam without exceeding the scope of contemplated embodiments. It is further understood that the expanded polyolefin may be formed using a heating medium in cooperation with a blowing agent, such as pertane.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A plastic structural article comprising:
   an elongated tubular plastic shell having opposed end sections, a middle section therebetween and an interior cavity; and
   a foam core comprising steam expandable polymer beads which when expanded substantially fill the interior cavity, wherein the middle section of the plastic shell has a foam core having a lower density than the foam core in the opposed end sections.

2. The article of claim 1, wherein the foam core and the end sections have a density ranging from 2 to 6 lbs. per cubic foot and the density of the foam core in the middle section has a density which is at least 1 lb. per cubic foot lower than the density of the adjacent end sections.

3. The article of claim 1, wherein the article is either a railroad tie or a bumper.

4. The article of claim 3, wherein the plastic shell has at least one inlet for introducing expandable polymer beads into the hollow interior cavity of the shell and a series of heating ports extending through the shell wall spaced along the elongated length of the shell for introducing at least partially vaporized heating media for expanding the expandable polymer beads.

5. The article of claim 1, wherein the middle section has a smaller cross-sectional area than the adjacent end sections.

6. The article of claim 5, wherein the end sections of the tie when oriented in a generally horizontal installed position have a generally flat top surface, a bottom surface which defines a plane spaced from and generally parallel to the top surface and have opposed side walls forming a generally trapezoidal shape.

7. The article of claim 6, wherein the bottom surface of the end sections has a transverse width which is greater than the corresponding width of the top surface.

8. The article of claim 7, wherein the side walls are generally straight.

9. The article of claim 7, wherein the side walls are generally concave.

10. A method of manufacturing a plastic structural article comprising:
blow-molding a plastic preform in a mold cavity in the shape of an elongated member to form an elongated tubular plastic shell having opposed end sections, a middle section therebetween and a hollow interior cavity;
forming at least one fill port and a plurality of heating ports in the wall of the plastic shell;
filling the shell interior cavity with expandable polymer beads;
injecting a hot, at least partially vaporized heating medium, into the heating ports to expand the expandable polymer beads so as to substantially fill the interior cavity of the shell;
constraining the plastic shell to limit expansion caused by the heated, expanding polymer beads until the assembly is cooled sufficiently to limit further expansion; and
releasing the plastic structural article from the mold cavity.

11. The method of claim 10, wherein the step of blow-molding further comprises extruding a thermoplastic tubular preform closing a hollow mold having an interior cavity the shape of a railroad tie about the extruded preform and blowing a pressurized gas into the hollow interior cavity of a preform causing the preform to expand to conformally fit the mold interior cavity.

12. The method of claim 10, wherein the step of forming at least one fill port in the wall of the shell occurs while the shell is in the mold cavity.

13. The method of claim 12, wherein the step of filling the shell interior with expandable polymer beads, the step of injecting a heating media and the step of constraining the shell all occur while the shell is in the mold cavity.

14. The method of claim 13, wherein at least three fill ports are formed in the shell with at least one fill port corresponding to each of the opposed ends and middle section wherein the step of filling the shell with the expandable polymer beads further comprising filling the middle section with lower density polymer beads that are filled into the end sections of the shell with the resulting core has a lower density in the middle section than the end sections.

15. The method of claim 10, wherein the step of blow-molding forms an elongated tubular shell having larger cross-sectional end sections than a middle section therebetween.

16. The method of claim 10, wherein the step of injecting a heating medium further comprises injecting hot steam into the heating ports.

17. A railroad tie, comprising:
an elongated plastic shell including opposed closed end sections and a middle section therebetween defining a cavity, the plastic shell including a pair of spaced apart embossments, one of which is situated on a first surface of each end section;
a pair of spaced apart metal mounting plates, one of which is situated in each of the embossments; and
a foam core of expanded polyolefin beads substantially filling the cavity, wherein the metal mounting plates are secured with ringed-shank fasteners.

18. The railroad tie of claim 17, wherein the railroad tie further includes a concave retention structure formed on a second surface of the elongated shell opposed to and spaced apart from the first surface.

19. The railroad tie of claim 17, wherein elongated shell comprises a wedge shape in longitudinal side elevation view.

20. The railroad tie of claim 17, further comprising a mounting surface for attachment of an electrified rail member connected to the railroad tie.

21. The railroad tie of claim 17, further comprising a sensor situated on or within the railroad tie.

22. The railroad tie of claim 17, wherein the polyolefin beads comprise homopolymer polyolefin beads.

* * * * *